United States Patent [19]

Jones et al.

[11] Patent Number: 4,827,263
[45] Date of Patent: May 2, 1989

[54] PULSE DOPPLER RADAR SYSTEM

[75] Inventors: Michael A. Jones, Harrow; David W. Joynson, St. Albans, both of England

[73] Assignee: The Marconi Company Limited, England

[21] Appl. No.: 118,656

[22] Filed: Nov. 9, 1987

[30] Foreign Application Priority Data

Nov. 14, 1986 [GB] United Kingdom ............... 8627332

[51] Int. Cl.⁴ .................... G01S 13/52; G01S 7/42
[52] U.S. Cl. .............................. 342/59; 342/99; 342/106; 342/201
[58] Field of Search .............. 342/59, 99, 200, 201, 342/111, 116, 28, 106

[56] References Cited

U.S. PATENT DOCUMENTS

| | | | |
|---|---|---|---|
| 3,386,093 | 5/1968 | Mooney, Jr. et al. | 342/99 |
| 3,618,083 | 11/1971 | Burley et al. | 342/28 |
| 3,754,254 | 8/1973 | Jinman | 342/28 |
| 4,079,376 | 3/1978 | Kirk, Jr. | 342/99 |
| 4,106,018 | 8/1978 | Chihak et al. | 342/59 |

FOREIGN PATENT DOCUMENTS 1097968 1/1968 United Kingdom .
1220321 1/1971 United Kingdom .

Primary Examiner—Salvatore Cangialosi
Assistant Examiner—Gilberto Barrón, Jr.
Attorney, Agent, or Firm—Kirschstein, Kirschstein, Othinger & Israel

[57] ABSTRACT

A method of preventing interference between 'friendly' pulse doppler radars when in action against a common target or adjacents targets. Despite considerable separation of the radar r.f's the pulsed signals have repeated sideband pulses which may be taken by another radar as a doppler-shifted echo. This problem is to a large extent alleviated by frequency modulating the r.f. transmission at a very low cycle rate of the order of one cycle per second and at a modulation rate sufficient to indicate to a receiving radar that the source could not be a target accelerating at such a high rate.

9 Claims, 3 Drawing Sheets

2½ sec.   25 kHz

¼ sec.   25 kHz

¼ sec.   25 kHz

PULSE DOPPLER RADAR SYSTEM

BACKGROUND OF THE INVENTION

This invention relates to a pulse doppler radar system for use on a target tracking missile in a situation where there might be two or more missiles having basically similar radar tracking systems, the missiles being mutually 'friendly' and tracking the same target or closely spaced different targets. In such circumstances there is a danger that each radar's transmission will be received by the other, either direct or indirect (e.g. after reflection from the ground) and considered as a target. The deceived radar may then lock on to the 'victim' radar and track it to destruction, or at least waste time in performing checks to eliminate it from consideration. This situation may come about despite significant separation of the radar transmission (r.f.) frequencies as may be seen by reference to FIGS. 1, 2 and 3 of the accompanying drawings.

FIG. 1 shows a typical radar transmission signal, comprising pulses of r.f. having a pulse duration of several microseconds and a pulse repetition frequency of perhaps 100 kHz. Such a signal has a frequency spectrum as shown in FIG. 2 comprising a center frequency component at the radar microwave frequency and a series of pulse sidebands of decreasing amplitude extending away from the center frequency component at spacings equal to the pulse repetition frequency. The center frequencies of two missile radars may be spaced apart significantly, e.g. by tens of megahertz so that there is little or no chance of mutual interference, but, as show in FIG. 3, the sidebands of one radar (shown in broken lines) may fall sufficiently close to the center frequency of another to be received as a doppler shifted return of that other.

SUMMARY OF THE INVENTION

An object of the invention is therefore to provide a pulse doppler radar which largely prevents acquisition of such interfering signals.

According to one aspect of the present invention, a pulse doppler tracking radar for use by a missile in air-to-air action, comprises means responsive to the rate of change of doppler frequency shift of target returns to control a doppler tracking loop, and frequency modulation means for modulating the transmitted radar signal at a rate which exceeds the rate of change of doppler frequency shift resulting from the acceleration of a target at a maximum practical rate, thereby avoiding any friendly radar locking on to the transmitted radar signal.

The radar may include doppler frequency filter means comprising a sequence of doppler frequency gates and means for detecting a minimum presence of a received signal in each gate and testing any received signal to confirm or reject it as a target return, the frequency modulation of the transmitted signal being at such a rate that it could not provide the minimum presence, thus avoiding any confirmatory testing of it as a target return.

The frequency modulating means may provide linear modulation or non-linear and in particular, sinusoidal, modulation having a maximum modulation rate in excess of the rate of change of doppler frequency shift resulting from a maximum acceleration target.

The frequency modulation rate is preferably an order higher than the above maximum rate of change of doppler frequency and may be of the order of 100 kilohertz per second.

In a radar system comprising a plurality of radars each as aforesaid, the respective frequency modulation means provide modulation at rates which are instantaneously different for the respective radars the minimum difference between these rates exceeding the above maximum rate of change of doppler frequency shift. In such a system the frequency modulation means may provide cyclic non-linear modulation whose amplitudes or phases or both are different for the different radars. In such a system there is also preferably provided a radar as aforesaid which does not have frequency modulation means. This radar does therefore in effect provide a zero rate frequency modulation.

According to another aspect of the invention, in a method of avoiding confusion between two or more pulse doppler radars, all, or all but one, of the radar transmissions are frequency modulated at instantaneously different rates such that the differential modulation between any two of the radars is at such a rate as could not practically arise by doppler shift from an accelerating target, and each radar suppresses received signals which produce, with its own frequency modulation, if any, a differential modulation rate in excess of a predetermined value.

BRIEF DESCRIPTION OF THE DRAWINGS

A pulse doppler radar tracking system in accordance with the invention will now be described, by way of example, with reference to the accompanying drawings, of which.

DETAILED DESCRIPTION OF THE PREFERRED EMBODIMENTS

Figure 1:
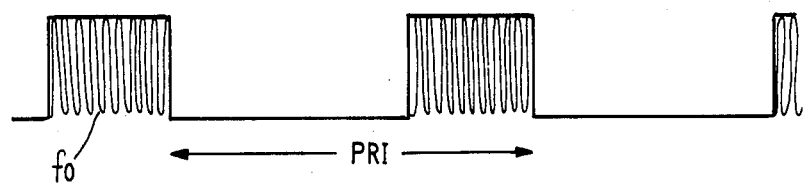
FIG. 1 is a diagram of a typical pulse radar signal in a time domain.
Figure 2:
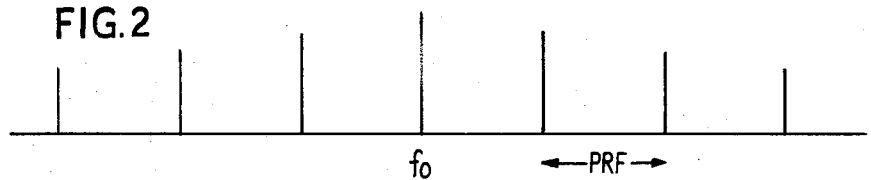
FIG. 2 is a diagram of the frequency spectrum of the same signal.
Figure 3:
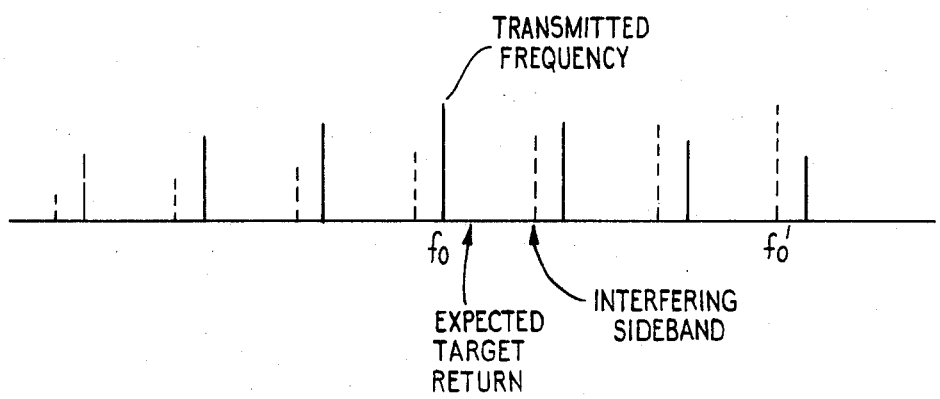
FIG. 3 shows two interfering frequency spectra from different radars.

Referring now to the drawings, FIGS. 1, 2 and 3 have already been described.

Figure 4:
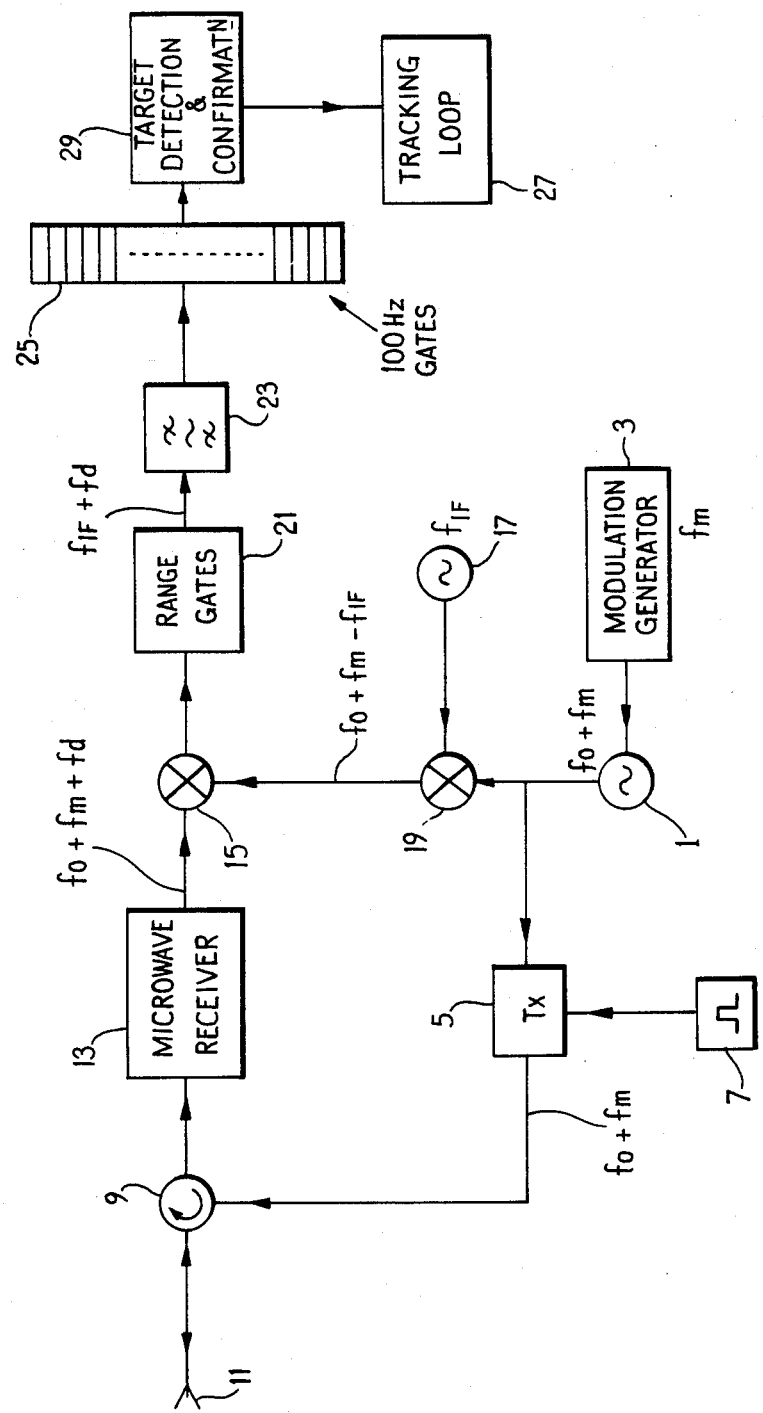
FIG. 4 is a block diagram of a doppler radar modified in accordance with the invention.

FIG. 4 shows components of a pulse doppler radar, components not relevant to the invention being omitted for simplicity.

The basic r.f. signal is provided by a microwave voltage controlled oscillator 1 having a basic frequency $f_o$. This frequency is varied by a modulation component $f_m$ in dependence upon a modulation waveform generator 3. The modulation waveform, which is of very low frequency, of the order of 1 Hz, may be a linear sawtooth, sinusoidal, or of other form, as will be explained. The modulated C.W. signal is applied to a transmitter 5 where it is pulsed by a pulse generator 7 to produce a signal such as that of FIG. 1. This is applied by way of a duplexer 9 to an antenna 11 for transmission to potential targets.

Signals received by the antenna 11, and these may include echoes of the transmitted signal and interfering signals from other radars, are applied to the duplexer 9 and then to a standard microwave receiver 13. The receiver output is applied to a mixer 15 together with a version of the transmitted signal $f_o+f_m$ offset by an intermediate frequency $f_{IF}$ by way of an oscillator 17 and mixer 19.

Considering first the situation where the received signal is an echo from a real target (i.e. not an interfering radar), the echo frequency as applied to the mixer 15 will be the transmitted frequency, doppler shifted according to the target velocity i.e., $f_o+f_m+f_d$, where $f_d$ is the doppler shift. There will also be a frequency shift due to the change in the modulation frequency $f_m$ over the transit time of the signal but this will be only 1 or 2 hertz at typical ranges and will be ignored for present purposes.

The output of mixer 15 will therefore be $$(f_o+f_m+f_d)-(f_o+f_m-f_{IF})=f_d+f_{IF}$$

This signal, which is still pulsed, is applied to timing, i.e. range, gates 21 in conventional manner to determine the transit time and thus range of the target. After a bandpass filter 23 the signal is applied to 'speed gates' 25 i.e. an array of 100 narrow band filters each of 100 hertz bandwidth and together covering the I.F. doppler band. While these speed gates are presently considered as analogue filters they may, of course be digital filters constituted by digital processors.

At constant relative target velocity the doppler shifted signal will remain in one of the speed gates, the output of which is applied to a doppler tracking loop 27 to track the target velocity and control the missile in known manner. If the target velocity is changing relative to the missile the doppler signal will drift through the speed gates at a rate dependent on the target acceleration. The tracking loop will nevertheless lock on to the signal assuming it is of sufficient magnitude and is not changing (velocity) so fast that it could not be a real target.

This assessment is made by a target detection and confirmation circuit 29 which scans the speed gates for target signals and considers a potential target pulse against a background of adjacent velocity signals. Thus an average magnitude value of the signals in frequency bins either side of the candidate bin, perhaps five bins on each side, is taken, against which to compare the magnitude of the candidate target signal. If this latter signal exceeds this average value by a sufficient predetermined amount then the candidate signal is confirmed as a target signal, and locked on in the tracking circuit.

The doppler range covered by the speed gates 25 is scanned for target signals by comparing each bin signal in turn with the local average, as above, thus employing a running average over the band. In this manner, a target signal which is locally prominent will not become lost in the overall signal whose average might exceed the candidate target signal because of other, more remote, 'target' signals or interference.

If, however, the candidate target signal amplitude should exceed the overall average then this will give substantial confirmation of the presence of a target. This comparison is also made therefore. The number of detections of the target in question is also a factor in confirmation of the presence of a target. If the target signal magnitude is only in excess of the local average then repeated checks may be necessary to confirm a target presence. An excess over the overall average will reduce the need for repeated checks.

In any event, it may be seen that some considerable time, relatively, may be spent if the detection and confirmation circuit 'pauses' on a potential target signal before rejecting it as noise. It is important therefore that, as far as possible, the receiver immediately rejects any signals originating from friendly radars.

In the above description it is clear that the frequency modulation imposed by the generator 3 has had no effect on the detection of echoes from 'real' targets. In the case of signals received from other sources however, the position is different.

A signal received from another, friendly, source, which has, either, no F.M. modulation or a significantly different rate of F.M., will be received and mixed with the signal $f_o+f_m-f_{IF}$ as before. This other, potentially victim, signal will have an r.f. frequency $f_o'$ significantly different from that, $f_o$, of the receiver under consideration. As explained above however, one or other sidebands of this signal may lie sufficiently close to the transmitted signal to simulate a doppler shifted return. The output of mixer 15 will be $f_o-f_o''-f_m+f_{IF}$ where $f_o''$ is a particular sideband of signal $f_o$ and is comparable to a doppler shift.

Figure 5:
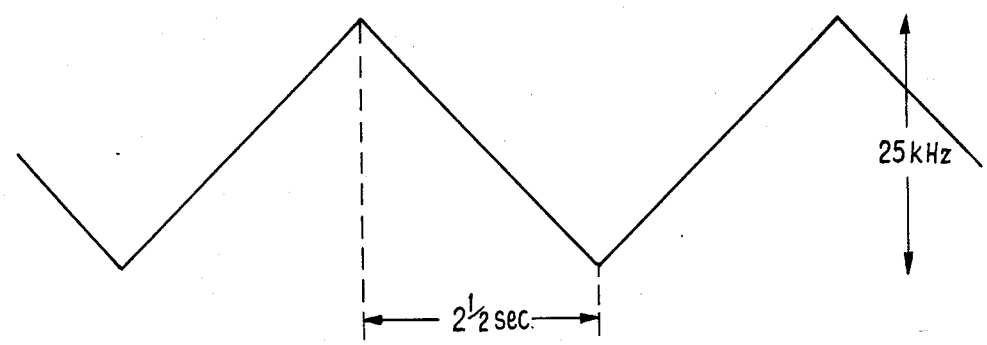
FIGS. 5 and 6 are diagrams of frequency modulation envelopes employed in FIG. 4.

In this case being considered, the 'victim' source has no F.M. modulation and the signal applied to the speed gates 25 appears to have a doppler shift changing at the rate of the imposed F.M. This may be as shown in FIG. 5, i.e. a linear sawtooth in which the amplitude corresponds to a change of 25 kHz and the (each) slope period is 2½ seconds. The F.M. rate is therefore 10 kHz/second which, considered as a changing doppler shift, might be the absolute maximum arising from any accelerating real target, illuminated by a 10 GHz radar. Clearly therefore, such a received signal could not be an echo from a real target and can be rejected out of hand.

The rejection of this signal is performed by the detection and confirmation process 29 in conjunction with the speed gates 25. The object is to spread the pulse signal applied to the speed gates 25 over a number of gates, i.e. frequency bins, simultaneously so as to maintain a low profile as it were, and render it undetectable against the background threshold, against which it is compared. The greater the F.M. rate the greater the simultaneous spread of the received pulse and the smaller the possibility of detecting it against the threshold. If the pulse can be spread to occupy 10 'local' bins simultaneously (i.e. covering 1 kHz) this gives a good chance of rejection. If spread over the whole array of 100 bins (10 khz) this increases the rejection rate further, and if spread beyond the array, over the P.R.F. of the received pulse, say 100 kHz, then the pulse is completely lost, since those sideband pulses in the vicinity of the receiver centre frequency will each be spread over 1 P.R.F. to completely fill the spectrum. The noise threshold will thus merely be raised over the band and the received pulse will be completely indistinguishable.

Figure 6:
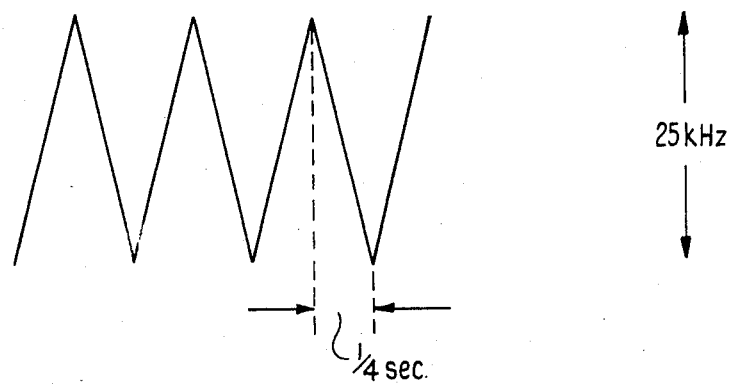
Figure 7:
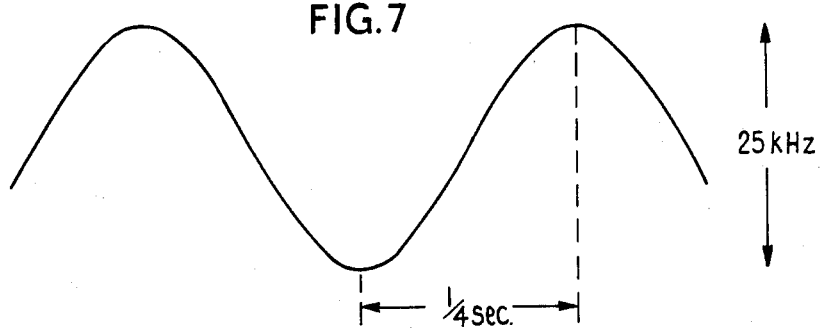
FIG. 7 is a diagram of an alternative, non-linear modulation envelope, FIGS. 5, 6 and 7 being to different time scales.

As a compromise, the modulating signal is made to extend considerably beyond the gate array and in FIGS. 5, 6 and 7 is given a sweep of 25 kHz. With a modulation rate of 100 kHz/second this will be seen to give a modulating frequency of 2 Hz, as shown in FIG. 6.

The above modulation rate imposed upon the signal applied to the speed gates arose from the transmitter's own F.M. modulation and the absence of any F.M. modulation in the victim radar. Equally it could have arisen from the opposite situation, the victim radar protecting itself by its F.M. modulation indicating that it was not a 'real' target. The output from the mixer 15 in the 'attacking' radar would have been similar and the attacking radar would have rejected the victim's transmission.

Where both radars have an F.M. modulation the differential rate must be sufficient to give the necessary spectral spreading.

Thus, where there are multiple radars the simultaneous F.M. slopes must be maintained different as far as possible. With linear modulation the amplitude or the period or both must be varied from radar to radar. Where a sinusoidal or other varying slope modulation envelope is employed, as shown in FIG. 7, the phases of the different radar modulations may be either locked out of phase or selected randomly. Again, the period or amplitude may be varied from radar to radar.

It will be clear that with multiple radars the individual F.M. rates will generally have to be increased to ensure that the differential rate is sufficient.

The detection threshold of the detection and confirmation circuit 29 is set at, say, 10 db above the noise level. If a received pulse exceeds this threshold a check and confirmation process is set in motion to decide whether the signal is genuine. While the above considerations are sufficient to prevent the modulated signal being confirmed as a target echo, F.M. modulated signals of, say, 10 kHz/second are not always sufficiently rapid (in frequency transition) to avoid being detected, assessed and finally rejected. Valuable time is thus wasted. In order to avoid the confirmation circuit 'pausing' in this way to check and reject a signal which just exceeds the recognition criteria, the F.M. rate has to be increased. The derivation of the F.M. rate criterion is as follows.

The suppression of a fast crossing signal in a filter gate is proportional to x, where $x = f_r t_o^2$, $f_r$ being the frequency modulation rate and $t_o$ being the reciprocal of the gate bandwidth.

The dwell time $t_d = 1/f_r t_o$. Thus $t_d = t_o/x$.

Now suppose the interfering signal can be 20 db above the victim receiver noise level, the detection threshold being 10 db above this noise level. Signal suppression of 20−10 i.e. 10 db (voltage ratio) is required to keep from exceeding the threshold so the dwell time of this signal in the 100 Hz gate must not exceed $$1/10 \text{ (i.e. 10 db)} \cdot 1/100 \text{ Hz}$$
$$\text{i.e. } 1/10 \cdot 1/100 \text{ seconds}$$
$$= 1 \text{ millisecond}$$

The F.M. rate through this gate must therefore be not less than 100 Hz in 1 millisecond i.e. 100 kHz/second.

Such a signal is shown in FIG. 6.

It will be noted that this F.M. rate is many times the rate (8–10 kHz/second) corresponding to the fastest manoeuvring real target. Thus there is a large tolerance on the F.M. rate to cover the reduction due to differentiating with a victim's F.M.

There is a limit however to increasing the F.M. rate, since despite subtracting the modulation on return of a genuine target echo, the transit time delay produces a residual shift which increases with range and F.M. rate. There is a basic spectral bandwidth of a genuine target due to differential velocities and target size and certain criteria should preferably be adhered to in the relation between this spectral bandwidth and the F.M. derived 'spread'.

Generally:
(a) The bandwidth spread of the intended target return should not exceed, or in some cases significantly increase, the expected maximum target spectral bandwidth.
(b) The combination of the spectral (maximum) bandwidth of the intended target return and the spread due to the anti-interference F.M. must not exceed the doppler gate width, or if it is lower, the radar's doppler discrimination width.
(c) The greater the F.M. spreads, the lower the increase in noise level in the victim radar receiver.

In estimating the spread due to the anti-interference F.M. it may be found this is greater at the longest range of the system whereas the target maximum spectral spread is greater at the shortest range of the system. In such cases, it is only necessary that (a) and (b) above be satisfied at particular ranges of interest.

At 10 Km range, the anti-interference F.M. 100 KHz/sec will spread the target return by:

$$\frac{(2 \times 10,000)}{3 \times 10^8} \times 10^5 = 6.67 \text{ Hz}$$

This is small compared to a maximum target spectral width of 30–50 Hz and it may be expected that this example could be used out to ranges up to 40 Km or more. If double F.M. rates were employed the maximum ranges would be limited to about 20 Km. Also at higher F.M. rates it is possible to spread the interference of the victim receiver up to the optimum spreading viz the P.R.F. rate. For 100 kHz P.R.F., e.g., this would result in 500 kHz/sec F.M. rate in ¼ second and a spreading of the signal of 50 Hz which is usually satisfactory.

The F.M. parameters can be varied during an engagement to optimise for the particular conditions existing at any one time. It is also possible to detect the presence of the now unique spectral characteristics of the interference and adapt the anti-interference parameters to optimise in the victim receiver.

We claim:
1. A pulse doppler tracking radar, comprising:
   (a) means for transmitting a pulse radar signal,
   (b) frequency modulation means for modulating the transmitted radar frequency at a rate which exceeds the rate of change of doppler frequency shift resulting from acceleration of a target at a maximum practical rate,
   (c) means for imposing said modulation on received signals so as to cancel said modulation in a target echo carrying identical modulation,
   (d) doppler frequency filter means comprising a sequence of doppler frequency gates for receiving a series of signal samples and periodically presenting a respective signal level for each of said frequency gates,
   (e) detection means for assessing the signal level output from each of said frequency gates against the signal levels of neighboring gates and rejecting a frequency gate output that is insufficiently prominent,
   (f) the modulation imposed by said frequency modulation means being at such a rate that a received signal of external origin carrying only the cancel- ing modulation is effectively spread over a number of said frequency gates, is not prominent in any single frequency gate output, and is not accepted as a target echo.

2. A radar according to claim 1, wherein said frequency modulation means provides linear modulation.

3. A radar according to claim 1, wherein said frequency modulation means provides sinusoidal modulation having a maximum modulation rate in excess of said rate of change of doppler frequency shift resulting from a maximum acceleration target.

4. A radar system comprising a plurality of pulse doppler radars, each of said radars comprising:
 (a) means for transmitting a pulse radar signal,
 (b) frequency modulation means for modulating the transmitted radar frequency at a rate which exceeds the rate of change of doppler frequency shift resulting from acceleration of a target at a maximum practical rate,
 (c) means for imposing said modulation on received signals so as to cancel said modulation in a target echo carrying identical modulation,
 (d) doppler frequency filter means comprising a sequence of doppler frequency gates for receiving a series of samples and periodically presenting a respective level for each of said frequency gates,
 (e) detection means for assessing the signal level output from each of said frequency gates against the signal levels of neighboring gates and rejecting a frequency gate output that is insufficiently prominent,
 (f) the modulation imposed by said frequency modulation means being different for each of said pulse doppler radars and being at such a rate that a received signal originating from another of said pulse doppler radars and carrying the differential modulation between the different frequency modulations imposed by the two radars is effectively spread over a number of said frequency gates, is not prominent in any single frequency gate output, and is not accepted as a target echo.

5. A radar system to claim 4, wherein said frequency modulation means provide cyclic non-linear modulation at least one of the amplitudes and phases of which are different for the different radars.

6. A method of avoiding confusion between two or more pulse doppler radars, comprising frequency modulating the transmission of at least all but one of said radars at instantaneously different rates such as to produce a differential frequency modulation rate between the transmission frequencies of every pair of said radars, the differential modulation between any two of said radars being at such a rate as could not practically arise by doppler shift from an accelerating target, and wherein each radar suppresses received signals which produce, in conjunction with its own transmission, a differential modulation rate in excess of a predetermined value.

7. A method according to claim 6, wherein said transmissions are modulated by modulating signals which are linear and differ in slope.

8. A method according to claim 6, wherein said transmissions are modulated by modulating signals which are sinusoidal and out of phase.

9. A method according to claim 6, wherein said transmissions are modulated by modulating signals which are sinusoidal and of different amplitude.

* * * * *